United States Patent
Watanabe

(10) Patent No.: US 8,049,446 B2
(45) Date of Patent: Nov. 1, 2011

(54) MOTOR CONTROL DEVICE AND MAGNETIC POLE POSITION ESTIMATION PRECISION CONFIRMING METHOD

(75) Inventor: Junichi Watanabe, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 164 days.

(21) Appl. No.: 12/499,539

(22) Filed: Jul. 8, 2009

(65) Prior Publication Data

US 2009/0267547 A1    Oct. 29, 2009

Related U.S. Application Data

(63) Continuation of application No. PCT/JP2008/055034, filed on Mar. 19, 2008.

(30) Foreign Application Priority Data

Mar. 28, 2007   (JP) .................... 2007-085683

(51) Int. Cl.
   *H02P 21/00* (2006.01)
(52) U.S. Cl. .............. 318/400.02; 318/400.01; 318/464; 318/720; 318/436; 318/430; 318/431; 318/400.06; 318/400.11; 318/400.14; 318/400.17; 318/400.33; 318/400.38; 318/400.39; 318/809; 318/810
(58) Field of Classification Search ............. 318/400.01, 318/400.02, 400.06, 400.11, 400.14, 400.17, 318/400.33, 400.38, 400.39, 809, 810, 430, 318/431, 464, 720, 436; 307/151; 361/2, 361/8, 9, 10, 12, 157
   See application file for complete search history.

(56) References Cited

U.S. PATENT DOCUMENTS

| | | | | |
|---|---|---|---|---|
| 4,814,677 A | * | 3/1989 | Plunkett | 318/400.02 |
| 5,994,870 A | * | 11/1999 | Kaneko et al. | 318/798 |
| 6,281,656 B1 | * | 8/2001 | Masaki et al. | 318/700 |
| 6,320,349 B1 | * | 11/2001 | Kaneko et al. | 318/798 |
| 6,593,714 B2 | * | 7/2003 | Nagayama | 318/400.07 |
| 6,677,724 B1 | * | 1/2004 | Kim et al. | 318/700 |
| 6,696,812 B2 | * | 2/2004 | Kaneko et al. | 318/700 |
| 6,707,265 B2 | * | 3/2004 | Imai et al. | 318/400.32 |
| 6,812,660 B2 | * | 11/2004 | Takahashi et al. | 318/400.02 |
| 7,294,988 B2 | * | 11/2007 | Ajima et al. | 318/712 |
| 7,498,761 B2 | * | 3/2009 | Iwashita et al. | 318/727 |
| 7,511,448 B2 | * | 3/2009 | Terada et al. | 318/807 |
| 2005/0104582 A1 | | 5/2005 | Toyozawa et al. | |

FOREIGN PATENT DOCUMENTS

| | | |
|---|---|---|
| JP | 01-303090 | 12/1989 |
| JP | 2003-088166 | 3/2003 |
| JP | 2005-151752 | 6/2005 |
| JP | 2006-141123 | 6/2006 |

* cited by examiner

*Primary Examiner* — Rita Leykin
(74) *Attorney, Agent, or Firm* — Ditthavong Mori & Steiner, P.C.

(57) ABSTRACT

A motor control device includes a dq-axis current control unit for generating a dq-axis voltage reference based on a dq-axis current reference and a dq-axis current signal, an initial magnetic pole position estimation unit for estimating a magnetic pole position of the motor upon power-on to generate a magnetic pole position signal, and a magnetic pole position estimation precision confirming unit for supplying a current in a d-axis direction after generation of the magnetic pole position signal with the initial magnetic pole position estimation unit, and checking an error of the magnetic pole position signal based on an angle of movement of the motor.

5 Claims, 1 Drawing Sheet

US 8,049,446 B2

MOTOR CONTROL DEVICE AND MAGNETIC POLE POSITION ESTIMATION PRECISION CONFIRMING METHOD

CROSS REFERENCES TO RELATED APPLICATIONS

The present application is related to PCT patent application Ser. No. PCT/JP2008/055034 titled "Motor Control Device, And Magnetic Pole Position Estimation Precision Confirming Method", and to Japanese Patent application no. 2007-085683 filed at Japan Patent Office titled "Motor Control Device, And Magnetic Pole Position Estimation Precision Confirming Method", all of which are incorporated herein by reference.

BACKGROUND OF THE INVENTION

1. Field of the Invention

The present invention relates to a motor control device and a magnetic pole position estimation precision confirming method, which can confirm magnetic pole position estimation precision.

2. Description of Related Art

Motor control devices need to supply a drive current in accordance with a motor's magnetic pole position at the time of driving a motor. The magnetic pole position is detected using a magnetic pole position sensor such as a hole device attached to the motor. If the motor is not provided with such a magnetic pole position sensor, the motor control device needs to estimate the magnetic pole position in any way.

For example, Japanese Unexamined Patent Application Publication No. 2003-088166 discloses a motor control device equipped with an initial magnetic pole position estimation unit, in which the initial magnetic pole position estimation unit estimates a magnetic pole position of a motor upon power-on to determine an initial magnetic pole position and subsequently derives an estimated magnetic pole position from a position signal of an encoder and an initial estimated magnetic pole position.

The initial magnetic pole position estimation unit includes a position reference waveform generating unit for generating a 2-period, S-shaped position reference pattern, a dq mode determination unit for determining whether a waveform pattern corresponds to a first period (q-axis control mode) or a second period (d-axis control mode), a position reference monotonic increase determination unit for identifying a portion that exhibits a monotonic increase in position reference pattern of the q-axis mode, a position reference monotonic increase determination unit for identifying a portion that exhibits a monotonic increase in position reference pattern of the d-axis mode, and an initial magnetic pole position correcting unit for adding data about a default initial magnetic pole position and data about an arbitrarily estimated initial magnetic pole position to obtain a final corrected initial magnetic pole position.

Further, the above motor control device issues any position reference and checks whether positional adjustment is completed within a predetermined period in order to confirm magnetic pole position precision after the completion of magnetic pole position estimation. In this way, the device confirms magnetic pole position precision.

SUMMARY OF THE INVENTION

The representative invention specified in the subject application is a motor control device for supplying a power to a motor to drive the motor, including: a dq-axis current control unit for generating a dq-axis voltage reference based on a dq-axis current reference and a dq-axis current signal; an initial magnetic pole position estimation unit for estimating a magnetic pole position of the motor upon power-on to generate a magnetic pole position signal; and a magnetic pole position estimation precision confirming unit for supplying a current in a d-axis direction after generation of the magnetic pole position signal with the initial magnetic pole position estimation unit, and checking an error of the magnetic pole position signal based on an angle of movement of the motor.

The other invention specified in the subject application is a magnetic pole position estimation precision confirming method, which is performed according to the following procedure including: estimating an initial magnetic pole position (step 1); supplying a current in a d-axis direction to lock a motor (step 2); determining an angle of movement φ (step 3); comparing the angle of movement φ with a predetermined angle α (step 4); giving OK to precision if the angle of movement is equal to or smaller than the predetermined angle α, and setting the angle of movement φ as a new correction angle to determine a magnetic pole position and correct an electric angle (step 5); determining precision as NG if the angle of movement exceeds the predetermined angle α, and counting up the number of tries (step 6); comparing the number of tries with a predetermined number of tries n (step 7); and returning to step 1 to restart processing if the number of tries is less than the predetermined number of tries or outputting an alarm signal if the number of tries is equal to or more than the predetermined number of tries (step 8).

BRIEF DESCRIPTION OF THE DRAWINGS

Exemplary embodiments of the present invention will be described in detail based on the following figures, wherein.

DETAILED DESCRIPTION OF THE PREFERRED EMBODIMENTS

Embodiments of the present invention will be described with reference to the accompanying drawings.

Figure 1:
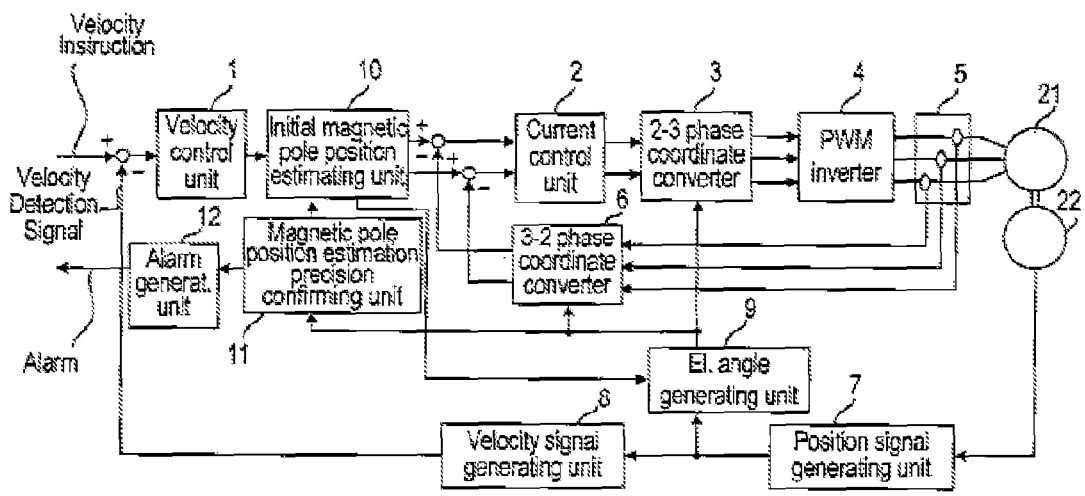
FIG. 1 is a block diagram of the configuration of a motor control device according to the present invention.

FIG. 1 is a block diagram of the configuration of a motor control device according to the present invention. In FIG. 1, the motor control device includes a velocity control unit 1, a current control unit 2, a 2/3-phase coordinate converter 3, a PWM inverter 4, a current detector 5, a 3/2-phase coordinate converter 6, a position signal generating unit 7, a velocity signal generating unit 8, an electric angle generating unit 9, an initial magnetic pole position estimation unit 10, a magnetic pole position estimation precision confirming unit 11, and an alarm generating unit 12.

Further, the motor control device drives a motor 21 and receives a motor position detected with an encoder 22.

The initial magnetic pole position estimation unit 10 estimates a magnetic pole position of the motor to determine an initial magnetic pole position and subsequently derives an estimated magnetic pole position from a position signal of the encoder and the initial magnetic pole position.

The velocity control unit 1 executes PID control processing on a difference between a velocity reference and a velocity signal to generate a torque reference, and in addition, converts the reference to a dq-axis current reference. The current control unit 2 performs PID control processing on a difference between the dq-axis current reference and a dq-axis current signal to generate a dq-axis voltage reference.

The 2/3-phase coordinate converter 3 converts the dq-axis voltage reference into a three-phase voltage reference based on a motor electric angle. The PWM inverter 4 generates a PWM signal using the three-phase voltage reference to amplify a power to drive the motor. The current detector 5 detects three-phase current signals Iu, Iv, and Iw.

The 3/2-phase coordinate converter 6 generates a dq-axis current signal as a two-phase current signal from the three-phase current signals Iu, Iv, and Iw based on the motor electric angle. The position signal generating unit 7 generates a position signal based on the motor position detected with the encoder 22. The velocity signal generating unit 8 generates a velocity signal through temporal subtraction of the position signals executed every control time.

The magnetic pole position estimation precision confirming unit 11 supplies a current to the motor in a d-axis direction after the estimation of the initial magnetic pole position and locks the motor to determine whether magnetic pole position estimation precision falls within a range of a predetermined angle based on the angle of movement. The alarm generating unit 12 generates an alarm signal and outputs the message to a higher level system if the number of tries to confirm magnetic pole position estimation precision reaches a predetermined number of tries.

Next, an operation of the magnetic pole position estimation precision confirming unit 11 is described.

Figure 2:
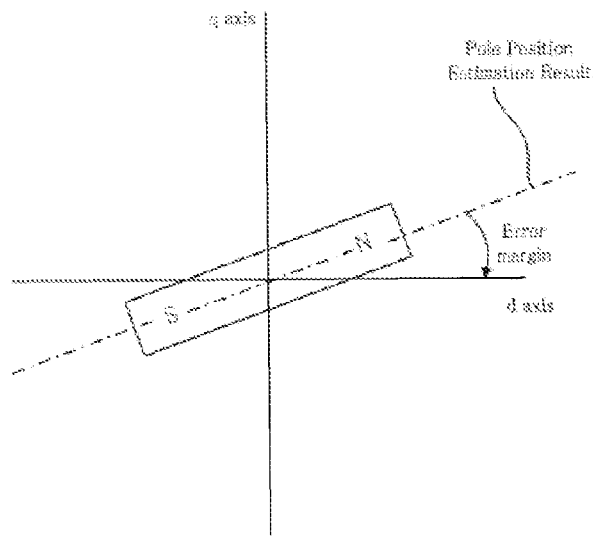
FIG. 2 is an explanatory view illustrating a magnetic pole position estimation precision confirming method executed in the motor control device according to the present invention.

FIG. 2 is an explanatory view illustrating a magnetic pole position estimation precision confirming method executed in the motor control device according to the present invention.

The magnetic pole position estimation precision confirming method is performed in accordance with the following procedure including: estimating an initial magnetic pole position (step 1); supplying a current in a d-axis direction to lock a motor (step 2); determining an angle of movement $\phi$ (step 3); comparing the angle of movement $\phi$ with a predetermined angle $\alpha$ (step 4); giving OK to precision if the angle of movement is equal to or smaller than the predetermined angle $\alpha$, and setting the angle of movement $\phi$ as a new correction angle to determine a magnetic pole position and correct an electric angle (step 5); determining precision as NG if the angle of movement exceeds the predetermined angle $\alpha$, and counting up the number of tries (step 6); comparing the number of tries with a predetermined number of tries n (step 7); and returning to step 1 to restart processing if the number of tries is less than the predetermined number of tries or outputting an alarm signal if the number of tries is equal to or more than the predetermined number of tries (step 8).

Here, the estimation of the initial magnetic pole position in step 1 may be performed based on an estimation method described in Japanese Unexamined Patent Application Publication No. 2003-088166, for example. Further, a new magnetic pole position signal may be determined by adding or subtracting the angle of movement $\phi$ to or from the generated magnetic pole position signal.

According to this magnetic pole position estimation precision confirming method, a current is supplied to direct a magnetic pole of the motor toward the d-axis direction based on the fact that the magnetic pole of the motor turns toward the direction in which a current flows.

In other words, in the case where the result of estimating an initial magnetic pole position (step 1) reveals that the magnetic pole is directed toward the d-axis direction, even if a current is forcedly supplied in the d-axis direction in step 2, the motor does not rotate, and the angle of movement $\phi$ of the locked motor is 0.

In some cases, however, an error occurs during the initial magnetic pole position estimation in the form of deviation from the d axis as shown in FIG. 2 (the direction indicated by the dashed line.

The magnetic pole position estimation precision confirming unit 11 forcedly supplies a current in the d-axis direction of the motor to move the motor to align the magnetic pole position with the d axis to set the angle of movement $\phi$ as an estimate error.

To describe the predetermined angle $\alpha$ used for determination about the angle of movement $\phi$, its practically applicable value is, for example, ±10 degrees with respect to the motor rotation angle.

As described above, according to the present invention, after confirmation of an initial magnetic pole position, a current is forcedly supplied in the d-axis direction of the motor to lock the motor, the angle of movement is measured, and precision is confirmed based on whether the angle of movement is equal to or smaller than the predetermined angle $\alpha$, and low precision is given NG while high precision is given OK to thereby enable safe and efficient operations.

Here, the present invention is described based on a rotary motor but is applicable to a linear motor as well.

Further, since the motor control device according to the present invention can exactly confirm magnetic pole position estimation precision after estimation of an initial magnetic pole position, the device can be expected to find wide applications in every industrial field requiring high efficiency.

What is claimed is:

1. A motor control apparatus to supply a power to a motor to drive the motor, comprising:
    a dq-axis current controller configured to generate a dq-axis voltage reference based on a dq-axis current reference and a dq-axis current signal;
    an initial magnetic pole position estimation device configured to estimate a magnetic pole position of the motor upon power-on to generate a magnetic pole position signal; and
    a magnetic pole position estimation precision confirming device configured to check an error of the magnetic pole position signal based on an angle of movement of the motor by supplying the motor with a current in a d-axis direction after the initial magnetic pole estimation device estimates the magnetic pole position.

2. The motor control apparatus according to claim 1, wherein the magnetic pole position estimation precision confirming device is configured to determine a new magnetic pole position signal based on a result of comparing the angle of movement with a predetermined angle to correct an electric angle of an applied current.

3. The motor control apparatus according to claim 2, wherein if the angle of movement is equal to or smaller than the predetermined angle, the magnetic pole position estimation precision confirming device determines the new magnetic pole position signal based on the angle of movement, and if the angle of movement exceeds the predetermined angle, the initial magnetic pole position estimation device estimates a magnetic pole position of the motor again to generate a magnetic pole position signal.

4. The motor control apparatus according to claim 2, wherein the predetermined angle can be arbitrarily set.

5. The motor control apparatus according to claim 1, further comprising:

an alarm generating device configured to generate an alarm signal if generation of the magnetic pole position signal in the initial magnetic pole position estimation device and confirmation of an error of the magnetic pole position signal in the magnetic pole position estimation precision confirming device are repeated a predetermined number of times.

* * * * *